United States Patent [19]

Lichtenhan et al.

[11] Patent Number: 5,412,053
[45] Date of Patent: May 2, 1995

[54] POLYMERS CONTAINING ALTERNATING SILSESQUIOXANE AND BRIDGING GROUP SEGMENTS AND PROCESS FOR THEIR PREPARATION

[75] Inventors: Joseph D. Lichtenhan, Palmdale; Ngo Q. Vu, San Diego; Jeffrey W. Gilman, Landcaster; Frank J. Feher, Costa Mesa, all of Calif.

[73] Assignee: The University of Dayton, Dayton, Ohio

[21] Appl. No.: 105,148

[22] Filed: Aug. 12, 1993

[51] Int. Cl.$^6$ .............................................. C08G 77/04
[52] U.S. Cl. ................................. 528/9; 528/37; 528/38; 528/40; 528/25; 556/450; 556/455; 556/460
[58] Field of Search .................. 556/450, 460, 455; 528/37, 40, 38, 25, 9

[56] References Cited

U.S. PATENT DOCUMENTS

| | | | |
|---|---|---|---|
| 3,294,737 | 12/1966 | Krantz | 528/40 |
| 4,349,609 | 9/1982 | Takeda et al. | 428/429 |
| 4,513,132 | 4/1985 | Shoji et al. | 528/21 |
| 4,745,169 | 5/1988 | Sugiyama et al. | 528/43 |
| 4,871,616 | 10/1989 | Kimura et al. | 428/407 |
| 5,039,771 | 8/1991 | Morimoto et al. | 528/14 |
| 5,043,789 | 8/1991 | Linde et al. | 357/52 |
| 5,047,472 | 9/1991 | Weidner et al. | 528/15 |
| 5,247,043 | 9/1993 | Nakashima | 528/14 |

OTHER PUBLICATIONS

Laine et al, Chem. Mat., (1990), vol. 2:464–472.
Rahn et al, Mat. Res. Soc. Symp. Proc., (1990), vol. 171:31–37.
Feher et al., "Silsesquioxanes as Models for Silica Surfaces", J. Am. Chem. Soc. 1989, 111, pp. 1741–1748.
Lichtenhan et al, "Silesquioxane–Siloxane Copolymers from Polyhedral Silsesquioxane", Macromolecules 1993, 26 No. 8.
"Ladder and Spiro Polymers", Concise Encyclopedia of Polymer Sci. & Eng., 1990 pp. 516–521.
Feher et al, "Enhanced Silylation Ractivity of a Model for Silica Surfaces", J. Am. Chem. Soc. 1990, 112, pp. 1931–1936.
Taylor et al, "The Preparation, Characterization and Use of Siloxanes as Precursors to Silicon Carbide", Polymer Preprints, vol. 32, 1991, pp. 586–587.
Rahn et al., Mat. Res. Soc. Symp. Proc., (1990) vol. 171, pp. 31–37.
Lichtenhan et al. "Silsesquixane–siloxane Copolymes from Polyhedral Silsesquioxanes", Macromolecules 1993, 26 No. 8.

Primary Examiner—John C. Bleutge
Assistant Examiner—Margaret W. Glass
Attorney, Agent, or Firm—Killworth, Gottman, Hagan & Schaeff

[57] ABSTRACT

A synthesis process for polysilsesquioxanes which produces a high yield, tractable copolymer of perfectly alternating silsesquioxane and bridging group segments is provided. A difunctional silsesquioxane monomer of the formula $Si_8R_8O_{11}(OA)_2$ or $Si_7R_7O_9(OSiR^4R^5R^6)(OA)_2$ is reacted with a difunctional compound of the formula X—M—X which forms a bridging group for a time sufficient to condense the difunctional silsesquioxane monomers and bridging groups into a linear polymer containing alternating silsesquioxane and bridging group segments. The resulting linear copolymer is essentially free of impurities and has controllable properties through the proper selection of the monomeric starting materials.

4 Claims, No Drawings

POLYMERS CONTAINING ALTERNATING SILSESQUIOXANE AND BRIDGING GROUP SEGMENTS AND PROCESS FOR THEIR PREPARATION

BACKGROUND OF THE INVENTION

The present invention relates to a process for the preparation of linear copolymers containing segments of silsesquioxane and the resulting product, and more particularly to processes and polymers in which regularly alternating silsesquioxane and bridging group segments are produced.

Polysilsesquioxanes exhibit a number of potentially useful properties including high temperature stability in air and good adhesion to a number of substrates. Polysilsesquioxanes are also resistant to oxidation and degradation by ultraviolet light. They may find use as protective coatings for electronic devices and other substrates and as precursors for ceramic coatings, foams, fibers, and articles. However, polysilsesquioxanes also are problematic in that prior art synthesis routes either have produced low yields of product or are complex. Further, the resulting polymers, because of their highly crosslinked nature, have been difficult to handle, purify, and characterize. Polysilsesquioxanes also exhibit a well-known propensity to form insoluble, intractable gels.

The prior art includes several methods of synthesizing silsesquioxane-based polymers, $(RSi(O)_{1.5})_x$. For example, Rahn et al, *Mat. Res. Soc. Symp. Proc.*, (1990) v. 171:31-37, teach producing a silsesquioxane copolymer through a catalytic redistribution reaction followed by a reaction with alcohols. Laine et al, *Chem. Mat.*, (1990), v. 2:464-472, teach the synthesis of methylsilsesquioxane polymers using a titanium-catalyzed redistribution of cyclomers or linear oligomers.

Sugiyama et al, U.S. Pat. No. 4,745,169, teach a polyorganosilsesquioxane polymer useful as a photoresist which is synthesized from a trichlorosilane or trialkoxysilane having a protected hydroxyl group. Kimura et al, U.S. Pat. No. 4,871,616, relate to a surface-treated polymethylsilsesquioxane powder used as an antiblocking agent. The polymer is formed by reacting a silicon compound with ammonia and water, allowing a hydrolysis/condensation reaction to occur, and then heating the resulting dispersion.

Linde et al, U.S. Pat. No. 5,043,789, describe a process for forming an insulating layer of a ladder-type silsesquioxane copolymer. The copolymer is synthesized by a condensation reaction with an aminoalkoxysilane and an arylalkoxysilane or arylsilazane monomer. Weidner et al, U.S. Pat. No. 5,047,492, describe several processes for the synthesis of organooligosilsesquioxanes using free radical addition and crosslinking reactions.

However, all of the prior art synthesis methods suffer from one or more of the following drawbacks. The synthesis routes used do not afford property control in the resulting polymer. The polymer quality and utility is limited due to impurities which arise from side reactions during synthesis. The synthesis route does not obtain a high yield, and/or the polymers produced have a limited shelf life because they contain reactive functionalities left over from the synthesis reaction.

Accordingly, the need still exists in the art for a synthesis process for polysilsesquioxanes which produces a high yield, tractable polymer which is essentially free of impurities and whose properties may be controlled.

SUMMARY OF THE INVENTION

The present invention meets those needs by providing a synthesis process for polysilsesquioxanes which produces a high yield, tractable copolymer of regularly alternating silsesquioxane and bridging group segments. The resulting linear copolymer is essentially free of impurities and has controllable properties through the proper selection of the monomeric starting materials.

In accordance with one aspect of the present invention, a process for the synthesis of polymers containing alternating silsesquioxane and bridging group segments is provided which includes the steps of providing a difunctional silsesquioxane monomer of the formula $Si_8R_8O_{11}(OA)_2$ or $Si_7R_7O_9(OSiR^4R^5R^6)(OA)_2$, where OA is —OH, —OSb(CH$_3$)$_4$, —OSn(CH$_3$)$_3$ or —OTl, R is an alkyl, alkenyl, aryl, or alkoxy group, and $R^4$, $R^5$, and $R^6$ are alkyl, alkenyl, aryl, olefin, or alkoxy groups, and reacting the difunctional silsesquioxane with a difunctional compound of the formula X-M-X, where M is a silane, siloxane, or organometallic bridging group, and X is (CH$_3$)$_2$N—, H$_8$C$_4$NC(O)(C$_6$H$_5$)N—, —CH$_3$, or —Cl, for a time sufficient to condense the difunctional silsesquioxane monomers and bridging groups into a linear polymer containing alternating silsesquioxane and bridging group segments. Preferred difunctional compounds for the synthesis include

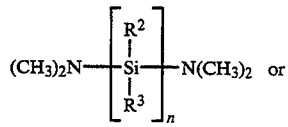

or

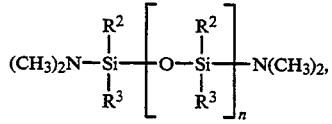

where n is an integer from 1 to 20 and $R^2$ and $R^3$ are alkyl, alkenyl, aryl, or alkoxy groups.

The copolymerization proceeds by a step growth condensation reaction between the hydroxyl or alkoxide groups on the silsesquioxane and the appropriate functionality (X) on the silane, siloxane, or organometallic bridging group. The polymer chain length may be controlled (1) by the stoichiometric addition of reagents or (2) by the addition of an excess of an endcapping monofunctional monomer such as N,N-dimethylaminotrimethylsilane or chloro-trimethylsilane to the reaction. The reaction results in high polymer yields which are in excess of 90% of theoretical. Because the reactants are difunctional, the resulting linear polymers are tractable and readily purified.

The synthesis reaction results in a copolymer composition having either the formula [—O—Si$_8$R$_8$O$_{11}$—O—M—]$_n$ or [—O—Si$_7$R$_7$O$_9$(OSiR$^4$R$^5$R$^6$)—O—M—]$_n$, where R is an alkyl, alkenyl, aryl, or alkoxy group, $R^4$, $R^5$, and $R^6$ are alkyl, alkenyl, aryl, or alkoxy groups, M is a Silane, siloxane, or organometallic bridging group, and n is a number which provides a weight average molecular weight for the polymer of from about 18,000 to 200,000. In a preferred embodiment of the invention, M is selected from the group consisting of $Si(CH_3)_2$, $SiCH_3$ (vinyl), $Si(CH_3)_2(CH_2)_2Si(CH_3)_2$, $Si(CH_3)_2OSi(CH_3)_2OSi(CH_3)_2$, $Si(CH_3)_2C_6H_4Si(CH_3)_2$, $[(CH_3)_5C_5]_2Zr$, and $[(CH_3)_5C_5]_2Ti$.

The molecular properties of the resulting copolymers may be controlled through (1) selection of appropriate R groups on the silsesquioxane or difunctional bridging compound or (2) variation of the silsesquioxane or difunctional bridging group structure. Thus, the copolymers can be tailored to have desired properties. For example, the polymers may be designed to be elastomeric or brittle or possess adhesive properties or not. The copolymers of the present invention may find use as thermal insulation, ablative materials, advanced composite resins, fibers, protective coatings, and biomedical materials. The copolymers may also be used as ceramic precursors for the casting of ceramic parts and the production of ceramic foams, fibers, and matrix composites.

Accordingly, it is a feature of the present invention to provide a synthesis process for polysilsesquioxanes which produces a high yield, tractable polymer which is essentially free of impurities and whose properties may be controlled. This, and other features and advantages of the present invention will become apparent from the following detailed description and the appended claims.

DETAILED DESCRIPTION OF THE PREFERRED EMBODIMENTS

The present invention utilizes as the starting monomeric material two difunctional polyhedral silsesquioxanes prepared according to the methods taught by Feher et al, *J. Am. Chem. Soc.* (1989) v. 111: 1741–1748, and Feher et al, *J. Am. Chem. Soc.* (1990) v. 112: 1931–1936, the disclosures of which are hereby incorporated by reference. The first silsesquioxane has the formula $Si_8R_8O_{11}(OA)_2$, where OA is —OH, —$OSb(CH_3)_4$, or —$OSn(CH_3)_3$, and R is an alkyl, alkenyl, aryl, or alkoxy group, and is represented structurally as formula 1 below.

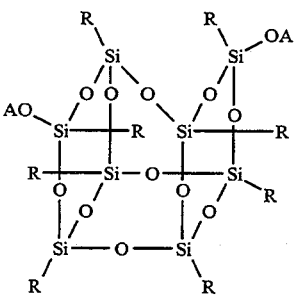

Formula 1

The second silsesquioxane has the formula $Si_7R_7O_9(OSiR^4R^5R^6)(OA)_2$, where OA is —OH, —$OSb(CH_3)_4$, —$OSn(CH_3)_3$ or —OTl; R is an alkyl, alkenyl, aryl, or alkoxy group; and $R^4$, $R^5$, and $R^6$ are alkyl, alkenyl, aryl or alkoxy groups. The second silsesquioxane is represented structurally as formula 2 below.

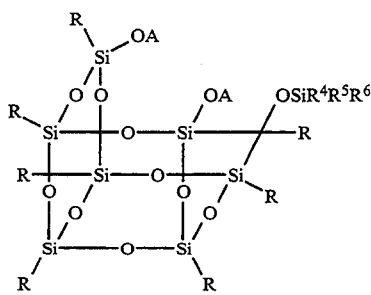

Formula 2

The R groups on the silsesquioxanes may generally be substituted or unsubstituted monovalent hydrocarbon groups having typically from 1 to 20 carbon atoms. Examples of alkyl groups include methyl, ethyl, propyl, butyl, hexyl, heptyl, octyl, and cyclohexyl groups. The R groups may also include alkenyl groups such as vinyl, allyl, hexenyl, heptenyl, and octenyl groups, and aryl groups such as phenyl groups. Alkoxy groups include the alkyl groups listed above linked by an oxygen.

These polyhedral silsesquioxane monomers have well-defined structures and contain only two reactive siloxide functionalities. These siloxide functionalities may be varied from hydroxyl (OH) to stibonium ($OSb(CH_3)_4$), stannyl ($OSn(CH_3)_3$), and thallium (OTl) groups. As taught by Feher et al, the polyhedral silsesquioxane monomers may be synthesized by a hydrolyric condensation of cyclohexyl trichlorosilane in aqueous acetone to provide the silsesquioxane of formula 1. Other substituted trichlorosilanes may be used to control the nature of the R groups which result on the silsesquioxane. Formula 2 may be synthesized by reacting a silsesquioxane of the formula $R_7Si_7O_{12}(OH)_3$ with N,N-dimethyl- or chloro-substituted silanes in a tetrahydrofuran/triethylamine solvent.

The stibonium group, —$OSb(CH_3)_4$, is attached to the silsesquioxane monomer by reacting the silsesquioxanes of formulas 1 or 2, where the OA groups are hydroxyl groups, with an excess of $Sb(CH_3)_5$ in benzene at 50°–60° C. for 2–4 hours. The stannyl group, —$OSn(CH_3)_3$, is attached to the silsesquioxane monomer by reacting the silsesquioxanes of formulas 1 or 2, where the OA groups are hydroxyl groups, with chlorotrimethylstannane in a tetrahydrofuran/triethylamine (95.5 v/v) solvent, or by reacting the stibonium derivative of formulas 1 or 2 with chlorotrimethylstannane in benzene at 50°–60° C. for 2–4 hours. The thallium group (—OTl) is attached to the silsesquioxane monomer by reacting the silsesquioxanes of formulas 1 or 2, where the OA groups are hydroxyl groups, with excess thallium ethoxide ($Tl(OCH_2CH_3)$) in benzene at room temperature for 2–4 hours.

As the co-monomer, a difunctional compound of the general formula X—M—X is provided, where M is a silane, siloxane, or organometallic bridging group, and X is $(CH_3)_2N$—, $H_8C_4NC(O)(C_6H_5)N$—, —$CH_3$, or —Cl. In a preferred embodiment of the invention, M is a silane or siloxane such as, for example, $Si(CH_3)_2$, $SiCH_3$(vinyl), $Si(CH_3)_2(CH_2)_2Si(CH_3)_2$, $Si(CH_3)_2OSi(CH_3)_2OSi(CH_3)_2$, or $Si(CH_3)_2C_6H_4Si(CH_3)_2$, or M is an organometallic bridging group such as, for example, $[(CH_3)_5C_5]_2Zr$, or $[(CH_3)_5C_5]_2Ti$. The difunctional monomers are reacted in a hydrocarbon solvent at elevated temperatures and an inert atmosphere for a time sufficient for the step-growth condensation reaction to occur as shown in formula 3 below.

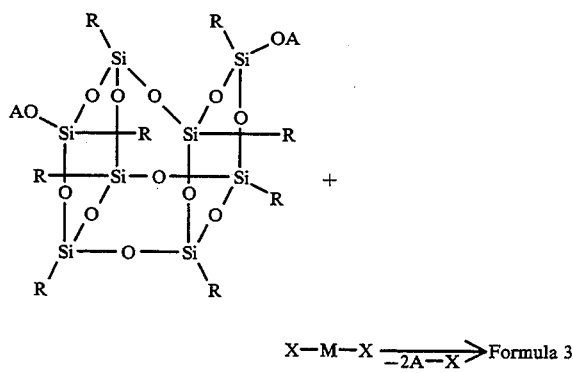

$$X\text{—}M\text{—}X \xrightarrow{-2A\text{—}X} \text{Formula 3}$$

hydrocarbon solvents for use in the present invention include xylene, tetrahydrofuran, and toluene. The reaction mixture may be heated to a temperature sufficient to reflux the mixture for a period of from about 4 to 48 hours. The resulting linear polymer has a weight average molecular weight of from about 18,000 to 200,000. Chain length of the copolymer may be controlled by the addition of a monofunctional endcapping compound such as N,N-dimethylaminotrimethylsilane to the reaction after an initial period of time or by limiting the reaction times.

The resulting copolymer may then be separated by removing the solvent and volatiles under reduced pressure, dissolving the copolymer in a hydrocarbon or chlorinated solvent such as hexane, and then adding to the solution an excess of methanol to cause a precipitate to form. Decanting the excess solvent and then drying the precipitate results in the copolymer of the present invention having repeating segments as shown in formula 4 below.

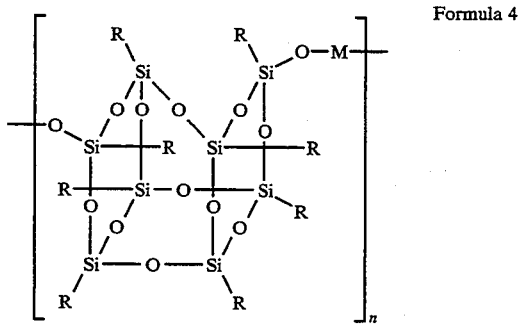

Formula 4

The polymers of the present invention are very soluble in common organic hydrocarbon and chlorinated solvents. The polymers are thermally stable at temperatures up to about 350° C. and show a 50–70% retention of their mass (char yield) after heating to 1000° C.

The properties of the resulting copolymers may be controlled through the manipulation of several variables. The molecular structure of the silsesquioxane monomer may be varied, for example, by choosing either formula 1 or formula 2 for the polymerization reaction. Formula 2 produces a less rigid polymer backbone structure than formula 1. The nature of the R groups on the silsesquioxane monomer may be controlled by selection of the substituted trichlorosilanes used to form it, for example, cyclohexyl, cycloheptyl, cyclopentyl, phenyl, or methylphenyl groups may be used.

The nature of the bridging group in the difunctional co-reactant may be modified, for example by selecting a longer or shorter chain length for the group or through the choice of substituents on the silicon or metal atoms. Polymerizations using the silsesquioxane monomer of formula 2 preferably utilize longer chain length or semi-rigid X—M—X comonomers.

Changes in the molecular structure of the silsesquioxane monomer and/or the chain length in the difunctional monomer may affect polymer stereochemistry, thermal properties such as $T_g$ and $T_m$, and thermochemical properties such as char yield. Changing the nature of the substituent R groups on either or both of the difunctional silsesquioxane and bridging compound will have an effect on the solubility of the resulting polymer in hydrocarbon solvents as well as thermochemical properties and interchain interactions.

For example, the following polymers produced by the process of the present invention are solid, brittle materials: hydroxy-terminated [—$OSi_8Cy_8O_{11}$-(O—$Si(CH_3)_2$)—], having a weight average molecular weight, $M_w$, of 20,000; trimethylsilyl-terminated [—$OSi_8Cy_8O_{11}$ (O—Si $(CH_3)_2$)—], with an $M_w$ of 20,000; hydroxy-terminated [—$OSi_8Cy_8O_{11}$O—$SiCH_3$-(vinyl)—], with an $M_w$ of 40,000; trimethylsilyl-terminated [—$OSi_8Cy_8O_{11}$(O—$SiCH_3$(vinyl)—], with an $M_w$ of 40,000. However, by controlling the chain length of the bridging segment, the following polymers produced by the process of the present invention are thermoplastics having moderate elastomeric properties: hydroxy-terminated [—$OSi_8Cy_8O_{11}$-(O—$Si(CH_3)_2(CH_2)_2Si(CH_3)_2$)—], with an $M_w$ of 110,000; trimethylsilyl-terminated [—$OSi_8Cy_8O_{11}$-(O—$Si(CH_3)_2(CH_2)_2Si(CH_3)_2$)—], with an $M_w$ of 110,000; hydroxy-terminated [—$OSi_8Cy_8O_{11}$-(O—$Si(CH_3)_2O[Si(CH_3)_2]_2Si(CH_3)_2$)—], with an $M_w$ of 18,000; trimethylsilyl-terminated [—$OSi_8Cy_8O_{11}$-(O—$Si(CH_3)_2O[Si(CH_3)_2O]_2Si(CH_3)_2$)—], with an $M_w$ of 18,000.

In order that the invention may be more readily understood, reference is made to the following examples, which are intended to be illustrative of the invention, but are not intended to be limiting in scope.

EXAMPLE 1

A polymer having the structure [—O—$Si_8R_8O_{11}$—O—M—]$_n$, where R is cyclohexyl and M is —$Si(CH_3)_2O(Si(CH_3)_2O)_2Si(CH_3)_2$ was synthesized by charging a 250 ml flask with $Si_8R_8O_{11}(OH)_2$ (7.79 gm, 7.08 mmol.) and bis(dimethylamino)octamethyltetrasiloxane (2.61 gm, 7.01 mmol.). Freshly distilled xylene was quickly added to the mixture and the resulting solution was stirred. The solution was then heated to 117° C. under a nitrogen atmosphere and allowed to react for 24 hours. Endcapping of the polymer was accomplished by adding an excess of N,N-dimethylaminotrimethylsilane (700 mg, 6 mmol.) to the solution and heating at 80° C. for an additional 2 hours. After the solvent and volatiles were removed under reduced pressure, the resulting polymer was dissolved in 20 ml hexane and then precipitated by adding the solution to an excess of methanol (1 liter).

The product was collected by decanting off the excess solvent. The remaining white solid was dried under dynamic vacuum for 3 hours. 9.67 gm, 96% of theoretical yield, of polymer was recovered. Spectroscopic analysis of the product was consistent with a polymer having the structure shown in formula 5 below.

Formula 5

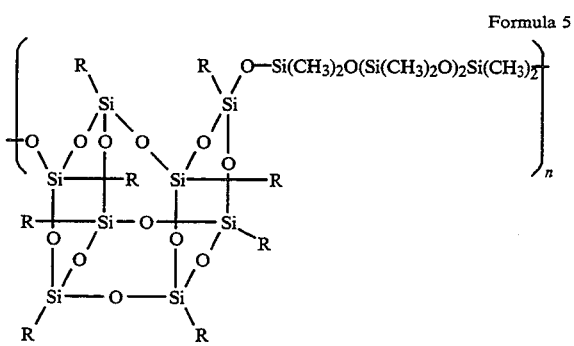

$^1$H NMR (CDCL$_3$) 1.72 (br, 40H), 1.23 (br, 40H), 0.71 (s, 8H), 0.10 (s, 25H); $^{29}$Si NMR (CDCL$_3$) −69.46 (s, 2Si), −68.12 (s, 4Si), −67,188 (s, 0.34Si), −66.34 (s, 2Si), −21.59 (s, 2Si), −21.32 (s, 2Si), 8.15 (s, 0.34Si).

EXAMPLE 2

The polymers identified below as polymers 1a through 2i were prepared using the same reaction scheme and conditions as in Example 1. Several properties of the resulting polymers were measured and are listed in Table I below.

TABLE I

| Polym. | SiR$^2$R$^3$ | M$_n$ (K) | M$_w$ (K) | M$_w$/M$_n$ | T$_g$ (°C.) | T$_m$ (°C.) | T$_{dec}$ (°C.) | % char |
| --- | --- | --- | --- | --- | --- | --- | --- | --- |
| 1a | —Me$_2$Si— | 21.2 | 33.2 | 1.56 | — | 240 | 400 | 60 |
| 1b | —Me(vinyl)Si— | 12.4 | 42.2 | 3.40 | — | 240 | 400 | 65 |
| 1c | —Me$_2$SiOSiMe$_2$— | | | | | | | |
| 1d | —Me$_2$SiOSiMe$_2$ O—SiMe$_2$— | | | | | | | |
| 1e | —Me$_2$SiO(SiMe$_2$—O)$_3$SiMe$_2$— | 8.1 | 18.3 | 2.26 | 60 | 100 | 450 | 70* |
| 1f | —Me$_2$SiO(SiMe$_2$—O)$_3$SiMe$_2$— | 40.0 | 202.0 | 6 | 40 | 60 | 400 | 51 |
| 1g | —Me$_2$SiOSiMe$_2$—C$_6$H$_5$SiMe$_2$OSiMe$_2$— | | | | | | | |
| 1h | —SiMe$_2$(CH$_2$)$_2$SiMe$_2$— | 23.4 | 32.7 | 1.39 | 90 | 125 | 440 | 51 |
| 1i | —SiMe$_2$(CH$_2$)$_2$SiMe$_2$—OSiMe$_2$C$_6$H$_4$SiMe$_2$—OMe$_2$Si(CH$_2$)$_2$SiMe$_2$— | 59.7 | 139.0 | 2.33 | 3 | 10 | 300 | 36 |
| 1j | —Me$_2$SiC$_6$H$_4$SiMe$_2$— | | | | | | | |
| 2e | —Me$_2$SiO(SiMe$_2$—O)$_2$SiMe$_2$— | 22.6 | 34.6 | 1.53 | 3 | 13 | 300 | 50* |
| 2f | —Me$_2$SiO(SiMe$_2$—O)$_3$SiMe$_2$— | | | | | | | |
| 2i | —SiMe$_2$(CH$_2$)$_2$SiMe$_2$—OSiMe$_2$C$_6$H$_4$SiMe$_2$—OMe$_2$Si(CH$_2$)$_2$SiMe$_2$— | 29.5 | 35.8 | 1.21 | −2 | −3.7 | 330 | 18 |

The number average molecular weights, M$_n$, ranged from 8,000 to 60,000 and were determined by the ratio of peak areas measured from the $^1$H and $^{29}$Si NMR spectra of the polymers and by gel permeation chromatography (GPC) using light scattering and refractive index measurements. The weight average molecular weights, M$_w$, ranged from 18,000 to 200,000 and were determined from light scattering measurements using a GPC equipped with a DAWN-F ™ detector (available from Wyatt Technologies, Santa Barbara, CA). All of the polymers exhibited high thermal stabilities at temperatures below 300° C. Upon further heating, the polymers are converted in high yields (55-70%) to the corresponding Si(O)$_x$(C)$_y$ containing ceramic. The polymer decomposition temperatures were determined in a nitrogen atmosphere and the temperature at which a 10% loss in sample weight occurred. The char yield represents the amount of material remaining after pyrolysis of the polymer sample at 1000° C. in N$_2$ atmosphere.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A compound of the formula

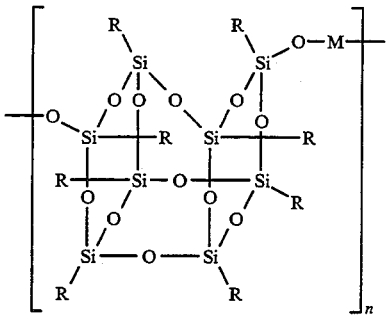

where R is an alkyl, alkenyl, aryl, or alkoxy group, M is a silane, siloxane, or organometallic bridging group, and n is a number which provides a weight average molecular weight for said polymer of from about 18,000 to 200,000.

2. The compound of claim 1 where M is selected from the group consisting of Si(CH$_3$)$_2$, SiCH$_3$(vinyl), Si(CH$_3$)$_2$(CH$_2$)$_2$Si(CH$_3$)$_2$, Si(CH$_3$)$_2$OSi(CH$_3$)$_2$OSi(CH$_3$)$_2$, Si(CH$_3$)$_2$C$_6$H$_4$Si(CH$_3$)$_2$, [(CH$_3$)$_5$C$_5$]$_2$Zr, and [(CH$_3$)$_5$C$_5$]$_2$Ti.

3. A compound of the formula

[—O—Si$_7$R$_7$O$_9$(OSiR$^4$R$^5$R$^6$)—O—M—]$_n$, where R is an alkyl, alkenyl, aryl, or alkoxy group, R$^4$, R$^5$, and R$^6$ are alkyl, alkenyl, aryl, or alkoxy groups, M is a silane, siloxane, or organometallic bridging group, and n is a number which provides a weight average molecular weight for said polymer of from about 18,000 to 200,000.

4. The compound of claim 3 where M is selected from the group consisting of Si(CH$_3$)$_2$, SiCH$_3$(vinyl), Si(CH$_3$)$_2$(CH$_2$)$_2$Si(CH$_3$)$_2$, Si(CH$_3$)$_2$OSi(CH$_3$)$_2$OSi(CH$_3$)$_2$, Si(CH$_3$)$_2$C$_6$H$_4$Si(CH$_3$)$_2$, [(CH$_3$)$_5$C$_5$]$_2$Zr, and [(CH$_3$)$_5$C$_5$]$_2$Ti.

* * * * *

UNITED STATES PATENT AND TRADEMARK OFFICE
CERTIFICATE OF CORRECTION

PATENT NO. : 5,412,053
DATED : May 2, 1995
INVENTOR(S) : Lichtenhan et al

It is certified that error appears in the above-indentified patent and that said Letters Patent is hereby corrected as shown below:

Column 1, after the title, please insert the heading --<u>Government Rights</u>-- and insert the following paragraph:

--This invention was made with Government support under Contract No. F04611-88-C-0020 awarded by the Department of the Air Force. The Government has certain rights in the invention.--

Signed and Sealed this

Thirty-first Day of October 1995

*Attest:*

BRUCE LEHMAN

*Attesting Officer*   *Commissioner of Patents and Trademarks*